United States Patent [19]
Wieczorek

[11] Patent Number: 6,135,570
[45] Date of Patent: Oct. 24, 2000

[54] WHEEL COVER HAVING A ONE-WAY LOCKING MECHANISM AND DECORATIVE NUT CAPS

[75] Inventor: Ted John Wieczorek, Rochester Hills, Mich.

[73] Assignee: McKechnie Vehicle Components (USA), Inc., Troy, Mich.

[21] Appl. No.: 09/283,057

[22] Filed: Apr. 1, 1999

[51] Int. Cl.[7] .................................................. B60B 7/14
[52] U.S. Cl. ........................................................ 301/37.37
[58] Field of Search .............................. 301/37.1, 37.37, 301/37.42, 108.4, 108.1

[56] References Cited

U.S. PATENT DOCUMENTS

| | | | |
|---|---|---|---|
| 4,382,635 | 5/1983 | Brown et al. | 301/37.37 |
| 4,707,035 | 11/1987 | Kondo et al. | 301/37.42 |
| 4,842,339 | 6/1989 | Roulinson | 301/37.42 |
| 4,962,968 | 10/1990 | Caplin | 301/37.37 |
| 4,998,780 | 3/1991 | Eshler et al. | 301/37.37 |
| 5,163,739 | 11/1992 | Stanlake | 301/37.42 |
| 5,181,767 | 1/1993 | Hugdins et al. | 301/37.37 |
| 5,249,845 | 10/1993 | Dubost | 301/37.37 |
| 5,595,422 | 1/1997 | Ladouceur | 301/37.37 |
| 5,667,281 | 9/1997 | Ladouceur | 301/37.37 |
| 5,842,749 | 12/1998 | DiMarco | 301/37.37 |
| 5,918,946 | 7/1999 | DiMarco | 301/37.37 |

*Primary Examiner*—S. Joseph Morano
*Assistant Examiner*—Long Bao Nguyen
*Attorney, Agent, or Firm*—Bliss McGlynn, P.C.

[57] ABSTRACT

A wheel cover includes a cover with a number of lug wells. The lug wells extend to a distal end. The lug nuts used to hold the wheel to the wheel hub also hold the wheel cover to the wheel. A nut cap covers the lug nuts to further aesthetically enhance the wheel. The lug wells include anti-rotational projections and nut cap stops to ensure the nut caps remain secured to the wheel cover. The anti-rotational projections and the nut cap stops extend up from locking flanges located at the distal end of the lug well. The anti-rotational projections and the nut cap stops do not intersect each other. The threads on the nut cap abut the anti-rotational projections as the nut cap is rotated over them and the nut cap stop prevents the nut cap from rotating past its engagement with the threads located within the lug wells.

16 Claims, 2 Drawing Sheets

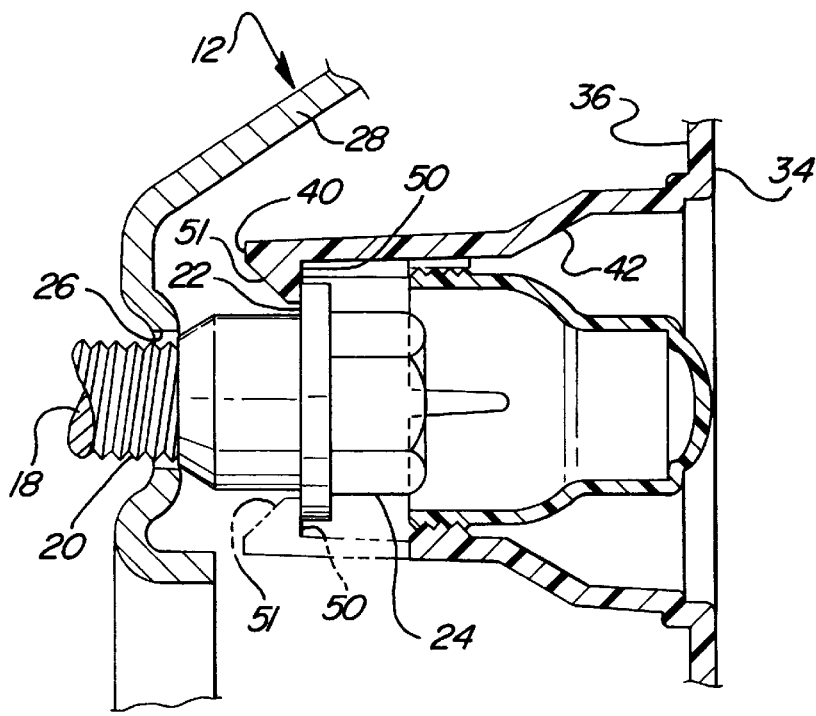
FIG-2
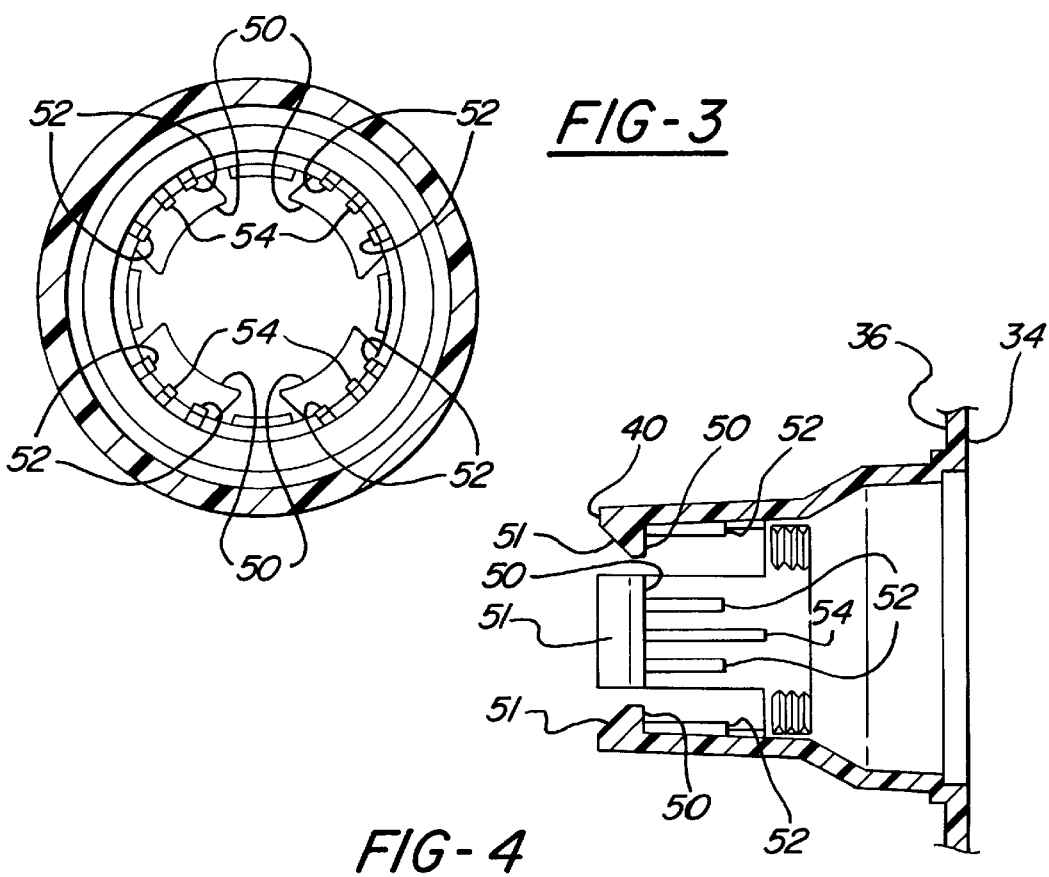
FIG-3
FIG-4

WHEEL COVER HAVING A ONE-WAY LOCKING MECHANISM AND DECORATIVE NUT CAPS

BACKGROUND OF THE INVENTION

1. Field of the Invention

The invention relates to cover assemblies for vehicular wheels and hubs. More specifically, the invention relates to locking systems for securing a cover assembly to a vehicular wheel, hub and/or lug nut.

2. Description of the Related Art

Wheel and hub covers (hereinafter "wheel cover") are used to decorate vehicular wheels. Many attempts have been made to conveniently and effectively secure the wheel cover to the wheel. One such attempt is disclosed in U.S. Pat. No. 4,382,635, issued to Brown et al. This reference discloses a wheel cover which covers a portion of the wheel, the lug nuts and all access thereto. Because access to the lug nuts cannot be made after it is attached, the axial fingers must resiliently grip the lug nuts to secure the wheel cover to the wheel. This system requires forcing the axial fingers back over the lug nut when removing the wheel cover so that the lug nuts may be accessed. This is a disadvantage because repeatedly accessing the lug nuts will reduce the resiliency of the axial fingers resulting in a loose wheel cover which vibrates and may be lost if the vibrations are of such a large magnitude to force the axial fingers back over the lug nuts. This will result in a greater frequency of wheel covers which may be lost or damaged due to the reduced resiliency of the axial fingers.

While the wheel cover that is secured to the wheel using the lug nut is decorative, designs not incorporating the resilient fingers, set forth above, require the openings over the lug nuts allowing the lug nuts to remain accessible after the wheel cover is secured to the wheel. When such openings exist, nut caps cover the lug nuts hiding them from view. Nut caps increase the cost of manufacturing the wheel cover to the complex tooling requirements to retain the nut caps to the wheel cover. Such retention systems typically include a threading system.

SUMMARY OF THE INVENTION

A cover assembly covers at least a portion of the wheel securable to a wheel hub using a lug nut. The lug nut includes a locking ridge. The cover assembly includes a cover having an outboard surface and an inboard surface. The cover assembly includes a lug well extending from the cover to a distal end. The lug well defines a lug wall having a threaded portion thereabout. The cover assembly includes a nut cap threadingly engagable with the threaded portion of the lug wall. The nut cap covers the distal end and the lug nut. The lug cover assembly further includes a nut cap stop extending out from the lug wall a predetermined distance. The nut cap stop is engagable with the nut cap to prevent the nut cap from disengaging the threaded portion of the lug wall.

One advantage associated with the invention is the ability to decoratively cover a vehicular wheel and/or hub. Another advantage associated with the invention is the ability to provide a wheel cover which is securable to the vehicular wheel using the lug nuts utilizing a push-on snap fit, which can be applied to the wheel after the assembly of the wheel to the wheel hub of the vehicle with the steel lug nuts; thus making the wheel cover theft deterrent in that it cannot be removed once installed without removing the vehicular lug nuts. Still another advantage associated with the invention is the ability to provide a cover having nut caps capable of covering the lug nuts which are used to secure the wheel cover and the vehicular wheel to the wheel hub. Still another advantage associated with the invention is the ability to manufacture a wheel cover with reduced costs of manufacturing while still maintaining the ability to secure the nut cap to the wheel cover. Yet another advantage associated with the invention is the reduced costs associated with assembly of the wheel to the motor vehicle in the plant.

BRIEF DESCRIPTION OF THE DRAWINGS

Other advantages of the invention will be readily appreciated as the same becomes better understood by reference to the following detailed description when considered in connection with the accompanying drawings, wherein:

FIG. 2 is a cross-sectional side view of the nut cap as it is secured to the wheel cover;

FIG. 3 is a cross-sectional top view of a lug well incorporating one embodiment of the invention; and FIG. 4 is a cross-sectional side view of the lug well incorporating one embodiment of the invention.

DETAILED DESCRIPTION OF THE PREFERRED EMBODIMENT(S)

Figure 1:
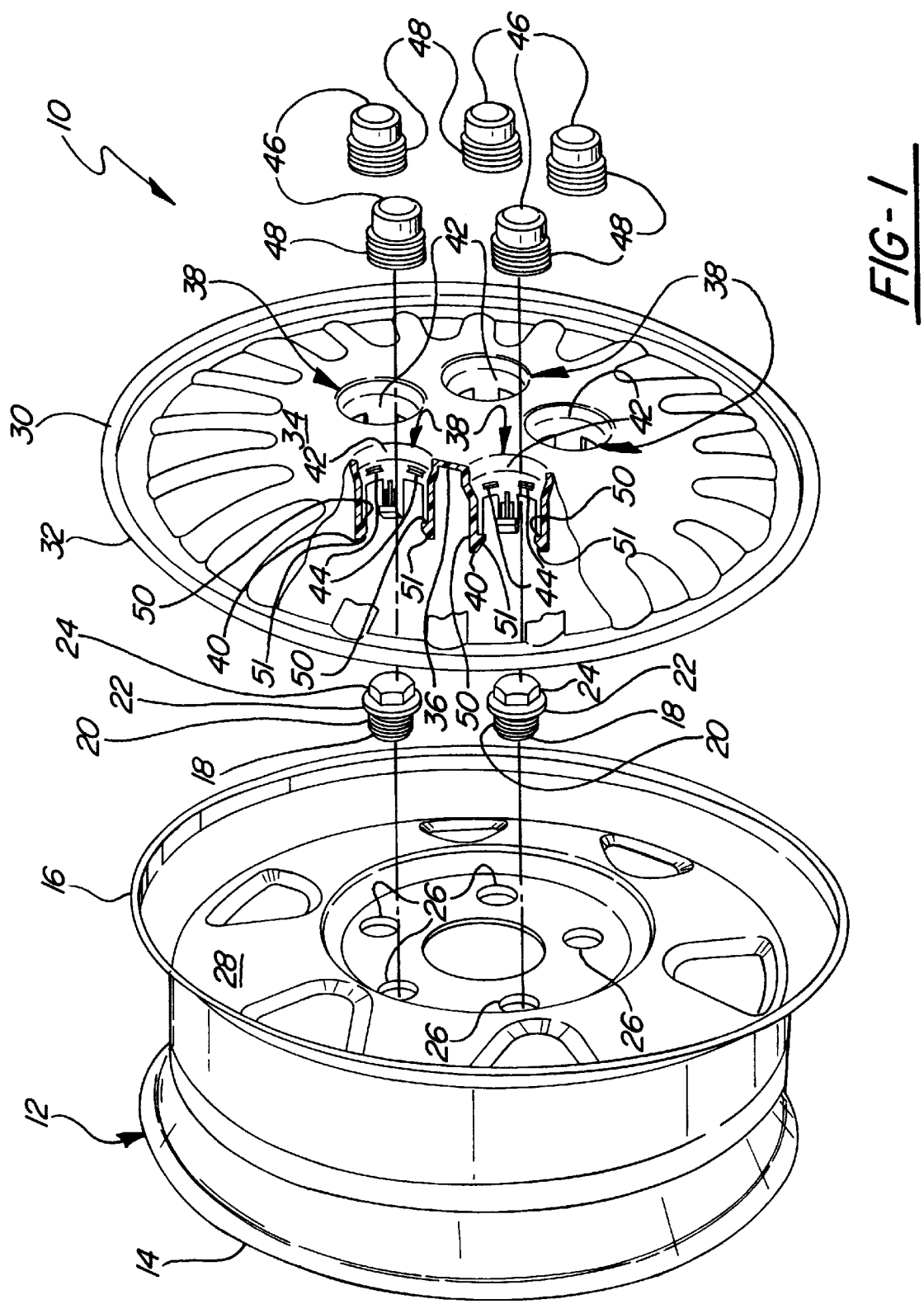
FIG. 1 is an exploded perspective view partially cut away of one embodiment of the invention.

Referring to FIG. 1, a cover assembly is generally indicated at 10. The cover assembly 10 is secured to a wheel generally shown at 12. The wheel 12 includes an inner rim 14 and an outer rim 16. Lug nuts 18 (two shown) secure the wheel 12 to a wheel hub (not shown). The lug nuts 18 include a threaded portion 20, a locking ridge 22 and a tool receiving end 24. The lug nuts 18 are received by holes 26 in the wheel 12. Although not shown in the Figures or discussed above, the lug nuts may be of the design which do not incorporate the lug stud. In this embodiment, the lug nuts include an interior surface which is threaded and is received by the lug stud which is, in turn, fixedly secured to the wheel hub.

The cover assembly 10 covers at least a portion of an outboard surface 28 of the wheel 12. In the embodiment shown in FIG. 1, the cover assembly 10 includes a cover 30 which covers the entire outboard surface 28. The cover 30 defines a periphery 32 which abuts the outer rim 16 of the wheel 12. The cover 30 includes an outboard surface 34 and an inboard surface 36. The outboard surface 34 typically includes a decorative design and/or a decorative finish.

The cover assembly 10 includes lug wells, generally shown at 38. The lug wells 38 are visible when viewing the outboard surface 34 of the cover 30. The lug wells 38 extend from the cover 30 to a distal end 40. More specifically, when the cover assembly 10 is mounted to the vehicular wheel 12, the lug well 38 extends from the outboard surface 34 past the inboard surface 36 and toward the outboard surface 28 of the wheel 12. Each of the lug wells 38 define a lug wall 42 which extends from the outboard surface 34 of the cover 30 to the distal end 40. Although the lug well 38 may have any number of lug walls 42, the lug well 38 in the preferred embodiment includes a single lug wall 42 circumscribing the lug well 38. In this embodiment, the lug wall 42 is generally frustoconical in shape and has a circular cross section.

The lug wall 42 includes a threaded portion 44 thereabout. In the preferred embodiment, the threaded portion 44 includes four protrusions 44 extending through a portion of the circumference of the lug well 38. The protrusions 44 are spaced equidistantly from each other and do not intersect or overlap each other. Each of the threaded portions 44 is a single thread. Therefore, each of the threaded portions 44 define a protrusion of a singular, rectangular shape. Because each of the protrusions 44 is singular and simple in shape, there is no need for detailed tooling and complex mold procedures to create these protrusions 44.

The cover assembly 10 also includes nut caps 46 which are threadingly engagable with the threaded portions 44 of the lug well 38. The nut caps 46, when installed in the lug wells 38, cover the distal ends 40 thereof and the lug nuts 18. The nut caps 46 include a threaded section 48 which threadingly engages the threaded portion 44 of the lug well 38.

The lug well 38 includes locking flanges 50 located at the distal end 40 thereof. The locking flanges 50 receive the locking ridge 22 of the lug nut 18. Although it may be appreciated that any number of locking flanges 50 may be used, the preferred embodiment shown in the Figures illustrates four locking flanges 50. The locking flanges 50 extend out perpendicularly to the lug wall 42 at the portion of the lug wall 42 that is disposed adjacent the distal end 40. The locking flanges 50 secure the cover assembly 10 to the wheel 12 when the lug nut 18 is secured to the wheel hub (not shown). The locking flanges 50 define a lead-in surface 51. The lead-in surface 51 has an angle non-perpendicular to the lug wall 42 to direct the lug wall 42 outwardly as the locking flanges 50 are forced over the lug nuts 18. The lead-in surface 51 provides for a "one hit" installation after the wheel 12 and lug nuts 18 are secured to the wheel hub. Therefore, the cover assembly 10 cannot be removed until the lug nut 18 is removed from the wheel hub. This allows the easy removal of the cover assembly 10 whenever the wheel 12 is removed from the wheel hub.

The cover assembly 10 also includes a nut cap stop 52. The nut cap stop 52 extends out from the lug wall 42 a predetermined distance. The nut cap stop 52 is engagable with the nut cap 46 to prevent the nut cap 46 from disengaging the threaded portion 44 of the lug well 38. In the preferred embodiment, there are two mirroring nut cap stops 52 disposed adjacent each of the locking flanges 50. The nut cap stops 52 extend up along the lug wall 42 from the locking flanges 50. The nut cap stops 52 prevent the nut cap 46 from disengaging the threaded portion 44 by stopping the rotation of the threaded section 48 of the nut cap 46 prior to its moving past the threaded portions 44 of the cover 30.

The cover assembly 10 also includes an anti-rotational projection 54 which extends out from the lug wall 42. The anti-rotational projections 54 extend out from the lug wall 42 a projection length which is less than the predetermined length of the nut cap stops 52. The projection length is less than the predetermined length so that the locking ridge 22 of the lug nut 18 may pass thereby. In the preferred embodiment, the anti-rotational projection 54 is disposed between the two mirroring nut cap stops 52 associated with a single locking flange 50. More specifically, the anti-rotational projection 54 is disposed between two nut cap stops 52. Four anti-rotational projections 54 extend out from the lug wall 42 and each are associated with each of the locking flanges 50. Each of the anti-rotational projections 54 extend up from the locking flange 50 to which it is associated.

The anti-rotational projections 54 are spaced from the outboard surface 34 a first length. The nut cap stops 52 are spaced from the outboard surface 34 a second length. The second length associated with the nut cap stops 52 is greater than the first length associated with the anti-rotational projection 54. Therefore, the nut cap 46 will engage the anti-rotational projections 54 before it is stopped by the nut cap stops 52.

The spatial relationship between the threaded portion 44 of the lug well 38, the nut cap stops 52 and the anti-rotational projections 54 are such that, when viewed from a top view (FIG. 3), none of these elements intersect each other. This design facilitates a simple tool construction and method of manufacturing the cover assembly 10. More specifically, even though a nut cap 46 is threadingly engaged with the cover assembly 10, the molds used to create the cover assembly 10 are such that they require merely two halves which pull away from each other in opposite directions. There is no requirement for additional complex tooling.

The invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the invention may be practiced other than as specifically described.

We claim:

1. A cover assembly for covering at least a portion of a wheel securable to a wheel hub by a lug nut having a locking ridge, said cover assembly comprising:

a cover having an outboard surface and an inboard surface;

a lug well extending from said cover to a distal end, said lug well defining a lug wall having a threaded portion thereabout;

a nut cap threadingly engagable with said threaded portion of said lug wall, said nut cap covering said distal end and the lug nut; and a nut cap stop extending out from said lug wall a predetermined distance between said distal end and said threaded portion such that none of said nut cap can pass by said nut cap stop whereby said nut cap stop engages said nut cap and prevents said nut cap from disengaging said threaded portion of said lug wall.

2. A cover assembly as set forth in claim 1 including an anti-rotational projection extending out from said lug wall.

3. A cover assembly as set forth in claim 2 wherein said anti-rotational projection extends out from said lug wall with a projection length less than said predetermined length of said nut cap stop.

4. A cover assembly as set forth in claim 3 wherein said anti-rotational projection is spaced from said cover a first length and said nut cap stop is spaced from said cover a second length wherein said second length is greater than said first length.

5. A cover assembly as set forth in claim 4 wherein said lug well includes locking flanges at said distal end thereof to receive the locking ridge of the lug nut.

6. A cover assembly for covering at least a portion of a wheel securable to a wheel hub by a lug nut having a locking ridge, said cover assembly comprising:

a cover having an outboard surface and an inboard surface;

a lug well extending from said cover to a distal end, said lug well defining a lug wall being frustoconical in shape and having a threaded portion thereabout;

a nut cap threadingly engagable with said threaded portion of said lug wall, said nut cap covering said distal end and the lug nut; and an anti-rotational projection extending out from said lug wall between said threaded portion and said distal end.

7. A cover assembly as set forth in claim 6 including a nut cap stop extending out from said lug wall a predetermined distance, said nut cap stop disposed adjacent said anti-rotational projection.

8. A cover assembly as set forth in claim 7 wherein said anti-rotational projection extends out from said lug wall with a projection length less than said predetermined length of said nut cap stop.

9. A cover assembly as set forth in claim 8 wherein said anti-rotational projection is spaced from said cover a first length and said nut cap stop is spaced from said cover a second length wherein said second length is greater than said first length.

10. A cover assembly as set forth in claim 9 wherein said lug well includes locking flanges at said distal end thereof to receive the locking ridge of the lug nut.

11. A cover assembly as set forth in claim 10 including a mirroring nut cap stop disposed adjacent said anti-rotational projection.

12. A cover assembly as set forth in claim 11 wherein said nut cap stop and said mirroring nut cap stop are on either side of said anti-rotational projection.

13. A cover assembly as set forth in claim 7 wherein said anti-rotational projection and said nut cap stop extend up from said distal end along said lug wall.

14. A cover assembly for covering at least a portion of a wheel securable to a wheel hub by a lug nut having a locking ridge, said cover assembly comprising:

a cover having an outboard surface and an inboard surface;

a lug well extending from said cover to a distal end, said lug well defining a lug wall and having a threaded portion;

a locking flange extending out from said lug wall at said distal end thereof, said locking flange including a lead-in surface extending out from said lug wall in a direction toward said outboard surface of said cover for receiving the lug nut such that the lug nut forces said locking flange out and around the lug nut as said cover assembly is forced onto the wheel;

a nut cap threadingly engagable with said threaded portion of said lug wall, said nut cap covering said distal end and the lug nut;

a nut cap stop extending out from said lug wall a predetermined distance and engagable with said nut cap to prevent said nut cap from disengaging said threaded portion of said lug wall; and an anti-rotational projection extending out from said lug wall.

15. A cover assembly as set forth in claim 14 wherein said anti-rotational projection extends out from said lug wall with a projection length less than said predetermined length of said nut cap stop.

16. A cover assembly as set forth in claim 15 wherein said anti-rotational projection is spaced from said cover a first length and said nut cap stop is spaced from said cover a second length wherein said second length is greater than said first length.

* * * * *